United States Patent [19]
Harkins et al.

[11] Patent Number: 5,657,461
[45] Date of Patent: Aug. 12, 1997

[54] USER INTERFACE FOR DEFINING AND AUTOMATICALLY TRANSMITTING DATA ACCORDING TO PREFERRED COMMUNICATION CHANNELS

[75] Inventors: Larry E. Harkins, Rochester; Ken Hayward, Brockport; Thomas J. Herceg, Pittsford; Jonathan D. Levine, Rochester; David M. Parsons, Fairport, all of N.Y.

[73] Assignee: Xerox Corporation, Stamford, N.Y.

[21] Appl. No.: 130,929

[22] Filed: Oct. 4, 1993

[51] Int. Cl.$^6$ ..................................................... G06F 3/14
[52] U.S. Cl. ........................... 395/333; 395/326; 395/335
[58] Field of Search ..................................... 395/500, 155, 395/156, 700, 326, 327, 328, 329, 330, 331; 345/149, 119, 156; 364/146, 514; 370/85.3, 85.15, 58.2, 60, 58.1

[56] References Cited

U.S. PATENT DOCUMENTS

| | | | |
|---|---|---|---|
| 4,872,157 | 10/1989 | Hemmady et al. | 370/60 |
| 4,875,206 | 10/1989 | Nichols et al. | 370/85.15 |
| 4,893,302 | 1/1990 | Hemmady et al. | 370/60 |
| 4,896,319 | 1/1990 | Lidinsky et al. | 370/60 |
| 4,899,333 | 2/1990 | Roediger | 370/60 |
| 4,922,486 | 5/1990 | Lidinsky et al. | 370/60 |
| 5,303,343 | 4/1994 | Ohya et al. | 395/200 |
| 5,317,568 | 5/1994 | Bixby et al. | 370/85.6 |
| 5,488,686 | 1/1996 | Murphy et al. | 395/161 |

*Primary Examiner*—Thomas G. Black
*Assistant Examiner*—Ruay Lian Ho
*Attorney, Agent, or Firm*—Ronald F. Chapuran

[57] ABSTRACT

A user interface to automatically distribute information to a receiver on a network using devices (such as printers and facsimile machines) and communication channels (such as electronic mail) defined in a receiver profile. The receiver profile establishes the properties and mode for receipt of information for receivers on the network and the profile is published in a network repository for all network users or is accessible by selected groups or individuals on the network. Receivers have additional control over network senders by defining an information filter which further controls sender channel access (to a receiver) by defining some channels as having priority of access such as direct or delayed access, as well as selectively permitting senders to override the receiver profile. Consequently, receiver profiles provide a variable receiver definable link to senders using multiple forms of media as well as multiple hardware platforms and network configurations.

18 Claims, 11 Drawing Sheets

USER INTERFACE FOR DEFINING AND AUTOMATICALLY TRANSMITTING DATA ACCORDING TO PREFERRED COMMUNICATION CHANNELS

BACKGROUND OF THE INVENTION

The present invention relates to a user interface for improving communication between devices or stations on a network. More specifically, the invention relates to a user interface having the option to define communication channels or virtual links between individual users or groups of users on the network and the capability to automatically send data to receivers based upon predetermined receiver defined communication channels.

As networks and systems become more integrated and more complex, the amount and speed of information flow between users creates a need for more versatile and more efficient control over the information flow process. Current systems do not enable receivers of information to define how they prefer their information received. Typically a sender controls the form information should take, forcing the receiver to accept information in the form defined by the sender.

Protocols defining integrated system behavior for devices such as printers, scanners, workstations and facsimiles, are well known. These protocols define how the systems should integrate across networks. Operational transparency across networks and device platforms, provide users with an increasingly integrated and transparent system environment. In this environment the manipulation of information (such as documents) is transparent to users as a result of the various network protocols that define the manner in which devices manipulate information. For example, "Office Systems Technology" Xerox Corporation, Palo Alto, Calif., 1984, OSD-R8203, is an overview of the Xerox Corporation "8000" series products, which include workstations, services, ethernet and software development. The "8000" series products are integrated using Ethernet and the Xerox Network Systems Communication Protocols which include: Intelnet Transport Protocols: Xerox System Integration Standard, Xerox Corp., Stamford, Conn., December 1981, XSIS-028112; Courier: The Remote Procedure Call Protocol, Xerox System Integration Standard, Xerox Corp., Stamford, Conn., December 1981, XSIS-038112; Clearinghouse Protocol, Xerox Corp., Stamford, Conn., April 1984, XSIS-078404; Authentication Protocol, Xerox Corp., Stamford, Conn., April 1984, XSIS-098404; Filing Protocol, Xerox Corp., Stamford, Conn., May 1986, XNSS-108605. Another example of an integrated system is the ISDN telephone network that provides services such as fax mail boxes and voice mail boxes.

The following Xerox Corporation U.S. patents include examples of systems indicating a network, server and printer usually having shared remote user terminals: U.S. Pat. No. 5,153,577; 5,113,517; 5,107,443; 5,072,412; 5,065,347; 5,008,853; 4,947,345; 4,939,507; 4,937,036; 4,899,136; 4,531,239; 3,958,088; 3,920,895, also, Fuji Xerox Co. U.S. Pat. No. 5,113,355. By way of background for system user interfaces, U.S. Pat. Nos. 5,072,412 and 5,107,443 disclose workspaces having an object-based user interface that appear to share windows and other display objects. A display system object can be linked to several workspaces giving workspaces the appearance of shared windows. These workspaces can be navigated through using metaphors such as moving from one room to another through doors. Additionally, these workspaces can be shared by groups of users over a network. Also of interest are U.S. Pat. No. 5,008,853 disclosing shared structured data by multiple users across a network, and U.S. Pat. No. 5,065,347 disclosing a method of presenting information hierarchically using a folder metaphor. Also noted is a print server disclosure by IBM Corp. U.S. Pat. No. 4,651,278 issued Mar. 17, 1987 to A. Herzog, et al. Also, noted for examples of printer controls are Xerox Corporation U.S. Pat. No. 5,133,048, and the October 1990 publication "The Xerox DocuTech® Production Publisher" from BIS CAP International, Newtonville, Mass., by Charles LeComte. Noted also are Xerox Corporation U.S. Pat. No. 5,170,340, and allowed U.S. Ser. No. 07/591,324 now U.S. Pat. No. 5,175,679, on networking thereof. Additionally, "Acrobat" products by "Adobe" will provide transparent document sharing. "Acrobat" can be viewed using a portable document format, through a "PostScript" file format that describes pages and their interrelation within a document.

Also noted are commercial network systems with printers is the 1992 Xerox Corporation "Network Publisher" version of the "DocuTech®" publishing system, including the "Network Server" to customer's Novell® 3.11 networks, supporting various different network protocols, such as "Ethernet™" and TCP/IP. Additionally noted is the Eastman Kodak "LionHeart™" system. A network publication noted is "Mastering Novell® Netware®", 1990, SYBEX, Inc., Alameda, Calif., by Cheryl E. Currid and Craig A. Gillett. Further noted are page description languages (PDL) for printers and systems as defined in "Interpress™: The Source Book", Simon & Schuster, Inc., New York, N.Y., 1988, by Harrington, S. J. and Buckley, R. R.; and Adobe Systems Incorporated "PostScript® Language Reference Manual", Addison-Wesley Co., 1990. Also noted is the Apple Corp. "Quickdraw™" software and its published materials.

Printers (and printer controllers or servers) are also sometimes referred to as "shared resources" in a networked environment. The server typically functions as a "spooler" to buffer the jobs that are sent to it, as well as a page description language (PDL) "decomposer", for converting the PDL files (e.g., "Interpress™" or "PostScript"®) to bitmapped files for application to the printer. Also of interest is Pennant Systems Co., Print Services Facility/2 (PFS/2), server-based software intended to act as a universal translator between various network protocols (LAN, TCP/IP and SNA) and printer document protocols (PCL and Postscript).

Another example of an established commercial integral system, with a shared printer and system server, comprises the Xerox Corporation "VP Local Laser Printing" software application package, which, together with the Xerox "4045" (or other) Laser Copier/Printer (CP), the "6085" "Professional Computer System" using Xerox Corporation "ViewPoint" or "GlobalView®" software and a "local printer [print service] Option" kit, comprises the "Documenter" system. The laser printer prints text and graphics with high quality resolution on a variety of paper sizes and special papers, including transparencies, labels, and envelopes. [When equipped with the optional copier feature, the "4045" CP also alternatively provides quick copies, functioning as a copier.] Printing occurs as a background process, enabling system users to continue with other desktop activities at their terminals. VP Local Laser Printing software can be loaded at a networked, remote, or standalone Xerox "6085" Professional Computer System (workstation).

Different workstations can access print services in different ways. To print a document, desirably the user can simply "copy" or "move" the document, with a mouse click or other command, to a printer icon on the workstation desktop, and set the displayed printing options, as on Xerox Corporation workstations. From other workstations such as the IBM PC's, the user may need to select menu items or type in commands to obtain access. The workstation selectable print options can include the number of copies, selected pages to be printed, paper size, image orientation, a choice of printers, and phone numbers when sending to a facsimile device. In addition, the option sheet allows the user to specify whether to delete the "Interpress™" or other master, or retain it at the workstation desktop. Already print-formatted or master documents may be transmitted to the printer directly, eliminating the need to repeat the conversion or decomposition process if another copy of the document is desired. If saved, an "Interpress™" master can be stored at the file service or even mailed to one or more individuals via an electronic mail service. Utilizing an internetwork routing service, users can transmit "Interpress™" or other printing masters through a network and then across an intelnet, typically, via telephone lines, twisted pair wires, coaxial cables, microwaves, infrared, and/or other data links, allowing documents created in one location to be automatically routed to a print service and printer hundreds or even thousands of miles away, in seconds or minutes.

The recently announced Xerox Corporation developed "PaperWorks"™ product utilizes a special encoded fine pattern of special marks ("glyphs"), electronically recognized as such using PC computer software by the facsimile electronic image receiver. It was initially configured to operate on a conventional personal computer having a conventional internal fax card and a modem, electronic mail system or other network connection to telecommunications, and running "Windows"™ software. A "PaperWorks"™ fax form carries a coded identification region which, upon scanning, may be decoded by an appropriate processing system. This coded identification allows the system to determine which of several different pre-stored forms the received form is, and what its page layout is. From this, the system can also extract the necessary user-entered information from the form to facilitate processing. An important feature of the "PaperWorks"™ system is the use of data defining a control sheet image to provide information in accordance with which operations are performed on data defining a sequence of images [data defining images, not actual physical sheets of a medium]. For example, the control sheet image can include information indicating a destination to which the fax server then transmits data defining said sequence of images.

The "User Handbook, Version 3.01" ©1988, for the Xerox "FaxMaster 21" product, indicates that it can automatically load hours of multi-page, multi-destination, facsimile transmission documents, and send them all with a few simple keystrokes, and can retrieve document from multiple locations, print them at the hub, store them on disk for later printout, or forward them to other facsimile terminals [automated store and forward]. It provides electronic mail capability by storing documents for retrieval by remote network users. It provides confidential [electronic] mailboxes, enabling secure document reception for only authorized personnel. It utilizes a personal computer with software, and can use remote touch-tone telephone access to the hub unit. Of particular interest, especially re voice telephone notification to recipients of fax messages, is U.S. Pat. No. 4,654,718 to T. Sueyoshi, assigned to Fuji Photo Film Co. It refers to facsimile correspondence containing codes for telephone numbers and sensors in the receiving equipment for reading these telephone codes. An "Octel System 200" voice mail system is called "outcall notification" and may be as follows: when one receives a message on his voice mail system that telephone system dials your pager number to alert you that you have a message. One's voice mail box number and pager number are both dedicated. Also, of course, manually, for many years, a Western Union operator would call a person to let them know that their telegram came in.

The aforementioned systems, however, do not enable the sender of information on a network to identify the receiver's preferable form of receipt and respond accordingly. Nor do the aforementioned systems provide the receiver of information the capability of designating preferred forms of information receipt that can be automatically carried out by senders on the network. Given that hardware platforms and different software representations of identical information exist, more and more users require a system that establishes the preferred form with which their information should be received.

Accordingly it would be desirable to provide a user interface including a screen display for recipients of data to define the information flow and, particularly, a user interface enabling an operator at the interface to establish the format, communication channel, and disposition of information to be transmitted.

It is an object of the present invention, therefore, to provide a new and improved user interface with the capability to selectively define the properties and communication channels for information to be sent over a network. It is still another object of the present invention to provide a user interface to define the preferred form of receiving information such as physical properties (printed) or intermediate properties (electronic mail, digitally stored voice mail or facsimile mail) or services and devices such as printers, facsimiles, telephones and video terminals. Still another object of the present invention is to be able to access a screen display to identify preferred channels or preferred receipt status for data sent to a receiver. Other advantages of the present invention will become apparent as the following description proceeds, and the features characterizing the invention will be pointed out with particularity in the claims annexed to and forming a part of this specification.

SUMMARY OF THE INVENTION

The present invention is a user interface to automatically distribute information to a receiver on a network using devices (such as printers and facsimile machines) and communication channels (such as electronic mail) defined in a receiver profile. The receiver profile establishes the properties and mode for receipt of information for receivers on the network and the profile is published in a network repository for all network users or is accessible by selected groups or individuals on the network. Receivers have additional control over network senders by defining an information filter which further controls sender channel access (to a receiver) by defining some channels as having priority of access such as direct or delayed access, as well as selectively permitting senders to override the receiver profile. Consequently, receiver profiles provide a variable receiver definable link to senders using multiple forms of media as well as multiple hardware platforms and network configurations.

BRIEF DESCRIPTION OF THE DRAWINGS

For a better understanding of the present invention, reference may be had to the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DESCRIPTION OF EMBODIMENT

In the description herein the term "hard copy" refers to a sheet of paper or other such conventional individual physical image substrate, and not to electronic images. The term "document" refers to either a single page or multiple pages that can be represented either as hard copy or in some intermediate electronically stored format for later rendering to a human understandable form such as hard copy or video display. A "job" refer to one or more documents or sets of documents being sent to or received by a particular addressee or designee. Additionally, the term "multimedia" is defined herein as documents that relay information using audio and/or video, where video includes documents in the form of text, graphics and/or images.

"Multimedia" can also encompass any information such as "electronic mail", "facsimile", "voice-mail" or any other media transferable through network having interconnected printers, scanners, facsimile devices or file servers. Multimedia can be encoded in a plurality of formats (i.e., glyphs, page description languages, ASCII, bar code, etc.) in order to optimize the quantity of data required for storage and transmission efficiency as well as the speed with which the media is rendered to users (e.g., electronic images displayed or printed). Plural mode or "multi-function" systems or "devices" combine printing, scanning, editing, facsimile and message receiver printing capability, where one such capability is defined as a "service". The term "printer" encompasses hard copy output from various input sources, including facsimile, scanners, keyboard entry, and electronic document images input.

The term "electronic mail" (email) also has various broad meanings, and can include multimedia transmission by either external telephone lines, and/or shared internal networks using optical fiber, twisted wire pairs, coaxial cable, wireless transmissions, or other networking media, or combinations thereof, of documents for electronic remote terminal displays and/or printer hardcopy printouts, to any of the numerous addresses designated by the sender.

A. System Architecture

Figure 1:
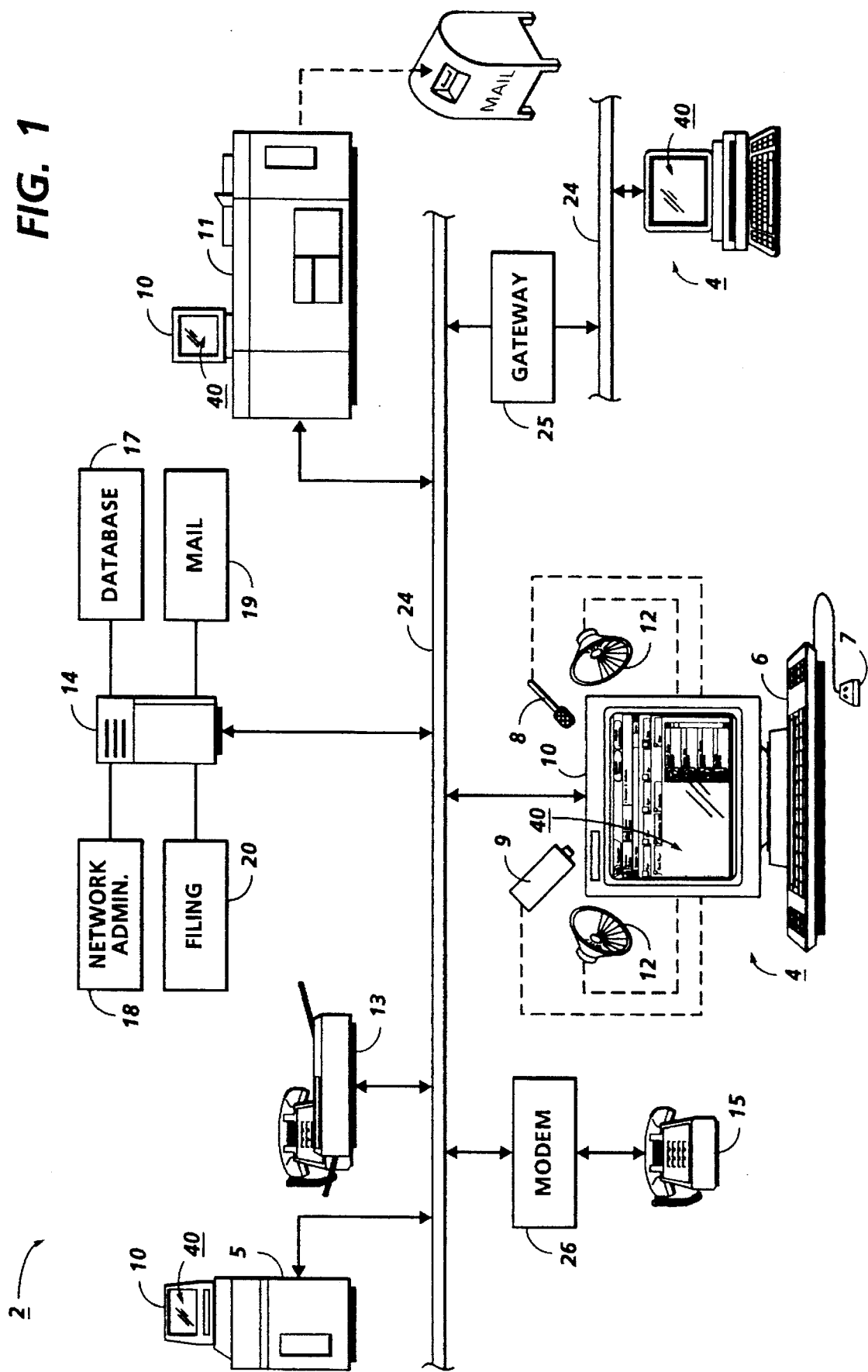
FIG. 1 is an illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. email, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application. Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview TM ("GV") software available from Xerox Corporation, which uses abstractions such as a desktop, inbasket, outbasket and documents.

Figure 2:
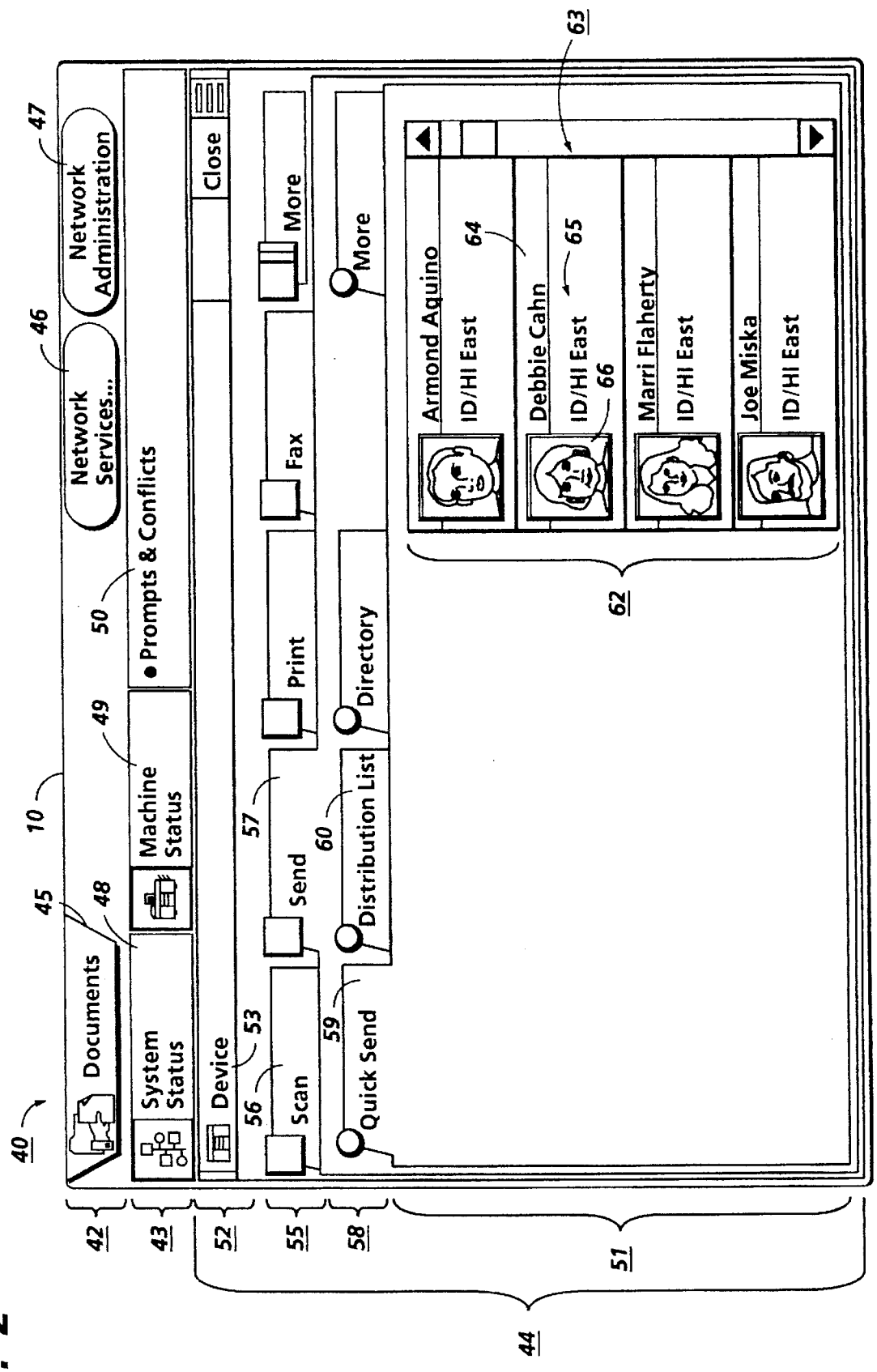
FIG. 2 is an enlarged view of the multi-device user interface used on the display screens shown in FIG. 1, and which embody communication channels of the present invention.

FIG. 2 shows an embodiment of a multi-function device user interface 40 which is displayed on screens 10 of Work station 4, printer 11 and scanner 5. User interface (UI) 40 can operate remotely from any system; it is extensible across network services using remote windowing protocols such as X windows ("X Window System", W. Scheifler and James Gettys, Digital Equipment Corporation, U.S., 1992, ISBN 1-55558-088-2). For example, the user interface 40 on printers 11 is available remotely from any Work station 4 or alternate service such as scanner 5. Specifically, the user interface 40 is divided into three regions; resource bar 42, status bar 43, and service area 44. Resource bar 42 is a menu bar that provides users access to high level services that are integrated on network 24. Within the resource bar document source or suitcase 45 provides the user with a temporary storage space for documents. Suitcase 45 stores active and editable documents for easy movement across network services, or it is a transitional space where documents are stored while a user navigates through network 24.

Further, provided on resource bar 42 is network services menu 46 and network administration menu 47. Network services menu 46 provides access to any networked service such as printer 11, facsimile 13, scanner 5, file server 20 (private, shared and public file storage), database server 17, mail servers (e.g. voice mail, email, etc.) 19, ports (such as modem 26, network gateway 25), and other Work stations 4. Also, available in services area 44 are published communications channels 63 available from network admin 18. These are channels that have been provided to a utility (not shown) that manages network administration 18. These channels included in a user profile are provided by a user who is to receive data from other users on network 24. Other utilities available in network admin 18 are distribution lists, service access lists and other domain and area network services. Network administration 47 provides users with access to utilities for identification and location of profiles and services. For example, network administration 47 includes information concerning user access privileges as well as resource privileges to file server access.

Status bar 43 is divided into three dedicated message areas, system message area 48, device message area 49, programming conflicts message and prompt area 50. Text is updated in the message area 50 as system status changes. The message area 50 can be selected to reveal more detailed messages. For example, when a printer is down, the message area gives a "Printer Down" message; further selection of the message area 50 provides more detail of causes for the printer to be down. Service area 44 groups and holds related services and features as well as provides user work space 51. A selected device is identified on herald menu 52, that is, cording on menu 52 provides utilities available to the device name 53. For example, device 53 could be a network publishing system with scanning, printing or faxing facilities. Device 54 would be the physical network publisher exporting the services. Service bar 55 groups services available on service 53. For example, a user could select a service module to access a specific document service (e.g. scan 56 or send 57). Service sub bar 58 provides access to subservices within service modules. Workspace 51 provides a user area for preparing documents for distribution, which can include publication and archival.

In particular, the send service 57, which is a service displayed on service bar 55, is selected and opened on user interface 40 as shown in FIG. 2. As shown in FIG. 2, the send service 57 has sub service bar 58, with sub-services, quick-send 59 and distribution lists 60. The send service 57 provides virtual links or communication channels to other users on network 24. Channels 62 are published to the network by a receiver in the form of a receiver profile to provide the receiver with the flexibility to define the mode (facsimile, hardcopy, email, voice mail, etc.) that the receiver's information should be received. In essence, the communication channels 62 are receiver setable information filters. A single communication channel 63 is identified using the user's name 64 as well as location 65 and illustrative identification 66 (e.g. a scanned-in picture, graphic, icon, etc.). Distribution list 60 is a sub-service that provides similar functionality as a quick-send sub-service except that distribution lists are communication channels that are directed to groups of individuals. It is a means for a user to build distinct distribution lists. Distribution list 60 subservice provides either distribution lists published to the network or be created by individual users.

B. Channel Architecture

Figure 3:
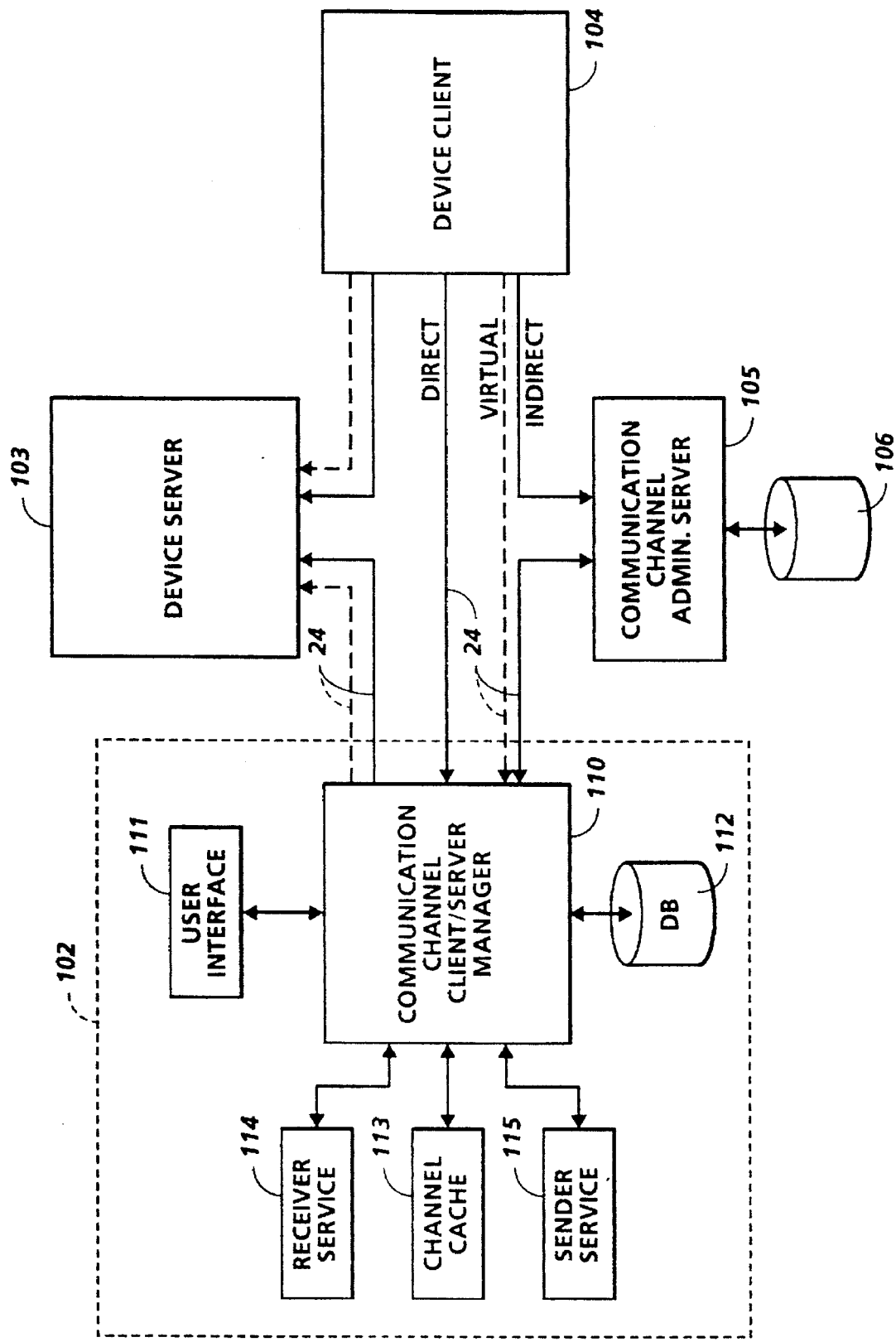
FIG. 3 shows a schematic view of the system architecture used in the system environment of FIG. 1.

The channel architecture is based on a client-server relationship, where client facilities are applications that are exported to the network 24, and server facilities are imported from the network. In other words, clients access exported server functionality. Thus, some services (printer, scanners, and the like) may only export or provide server functionality while using no client functionality. As a result, both the channel client and channel server may operate on the same service as well as uniquely on different services. The architecture is shown in detail in FIG. 3, where an integrated client/server system 102 is operating with stand-alone client 104, server 103 and communication channel admin server 105 that provides network administrative facilities such as storing communication channel information on disk 106.

Common to both the client and server architecture is communication channel manager 110. Manager 110 interfaces user interface 111 with network 24, local storage disk 112 and cache 113, receiver service 114 and sender service 115. Listed in Appendix A is an example of an interface for manager 110 between user interface 111 and receiver and sender service 114 and 115. Local storage available to manager 110 is in the form of long-term storage 112 (e.g. disk, floppy or tape) and short-term fast access, or cache storage, 113. Receiver service 114 provides server functionality while sender service 115 provides client functionality to manager 110. Manager 110 establishes virtual links or communication channels 63 either directly to other servers such as server 103 or indirectly through admin server 105.

C. Channel Control (Receiver Service)

1. Channel Profile Publication

Figure 4:
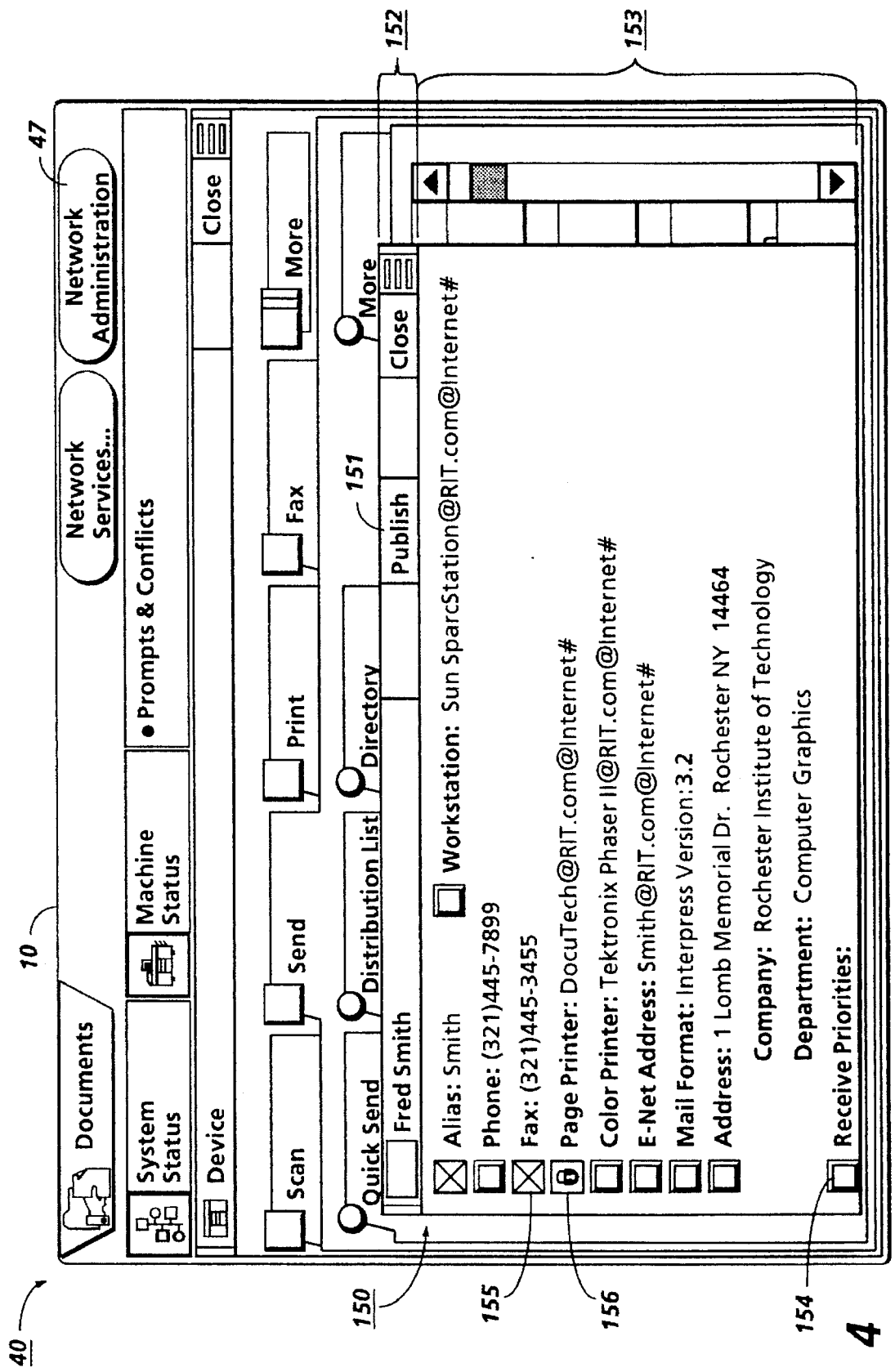
FIG. 4 shows a simulated screen image of a communication channel being published.

Communication channel control begins with the receiver defining the preferred form(s) that documents should take when received. The user activates profile 150, shown in FIG. 4, by selecting display user profile command (not shown) from the network administration menu 47. User profile 150 is completed by a user, for example Fred Smith, and published to network administration 105 using the publish command 151 or the profile herald bar 152. Publication to other network users defines the preferred form with which the publisher, namely Fred Smith, desires his information to be received. Profile properties 153 are a number of different profile categories, each category can be either checked, locked, or unselected. If a category is unselected, then a category is neither locked nor checked. A checked category such as fax category box 155 identifies facsimile as the users established default receive preference. For example, given Fred Smith checked the fax box, then all facsimile documents sent to him are routed to the fax at the identified phone number in the profile properties 153. In a similar manner, Fred Smith can set his preference for a particular page printer, color printer, or any other device to receive information. It should be noted that it is well within the scope of the present invention that multiple printers or devices can be listed or scrolled and the user or receiver can rank the devices or modes of communication in a priority of preference to receive information.

Also, the user or publisher can selectively lock choices or set-ups using a lock as shown in page printer box 156. The lock function inhibits users from changing the published set up. The lock feature can be any hard or soft button or indicator to inhibit alteration of a specified mode or device.

In other words, both a check box and a lock identify receiver preference, where the lock disables the ability of the sender to deviate from the published receiver profile. For example, users sending documents may desire changing the preferred printer, if unlocked, to enable color printing rather than black and white printing.

Figure 5:
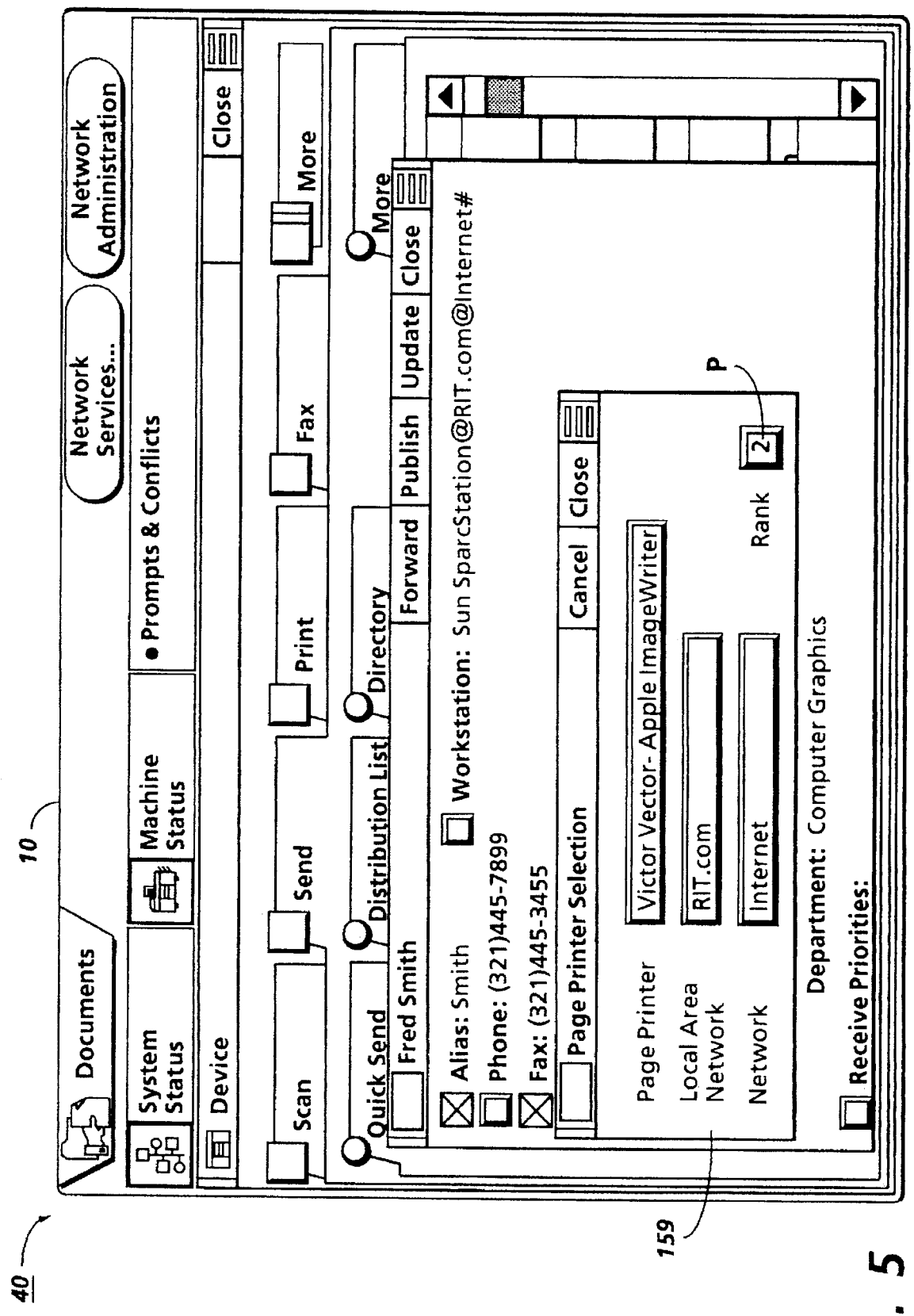
FIG. 5 shows a simulated screen image of a property of a communication channel being modified.

Each profile property 153 is further selectable through each box category as indicated above. For example, the page printer selection window 159 shown in FIG. 5 depicts how users change the set-up of a particular category. Page printer window 159 opens as a result of double clicking on the page printer button 156. Once the user, Fred Smith, has selected a preferred page printer by filling out the appropriate categories in window 159 including a privacy button P as shown, the user can either apply these selections or cancel them by selecting "Cancel," or "Close" on the herald bar of window 159. The profile properties 153, however, are not limited to those shown in user profile 150. Any preferred form of receipt may be entered as a property in profile 150, some examples include a video conferencing center and a voice mailbox.

Figure 6:
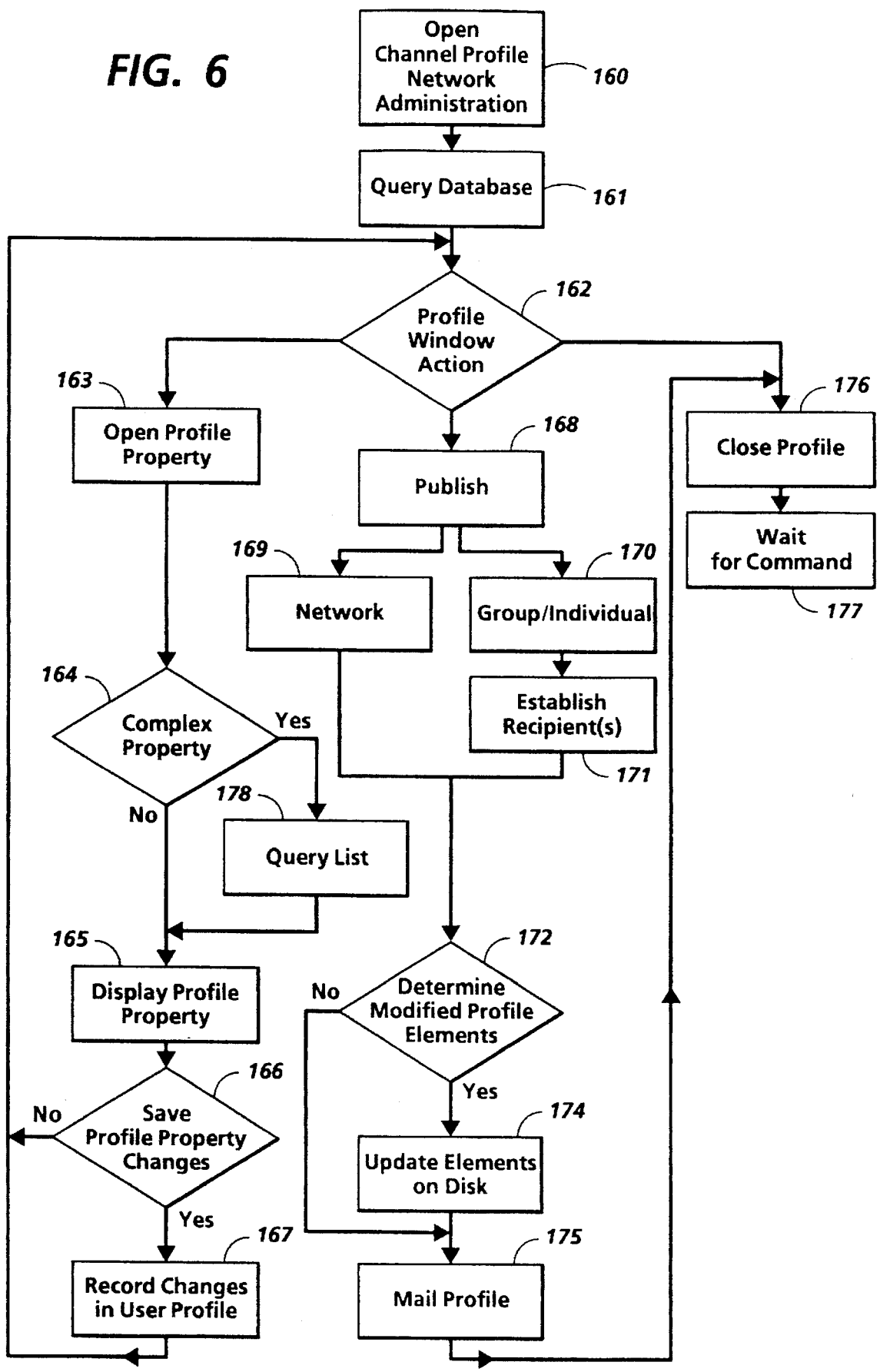
FIG. 6 is a flow chart showing the general steps involved with publishing a communication channel.

The sequence of steps for publishing the user profile 150 (shown in FIGS. 4 and 5) with network administration 47 is depicted in FIG. 6. In box 160, the user opens the user profile by invoking the "open user profile" command (not shown) in the network administration menu 47. In box 161, manager 110 (FIG. 3) is activated with receipt of the open channel profile command identified as "Open Channel Profile" in Appendix A. To return the user profile, manager 110 queries channel profile database 112 for the logged on user's current profile. Alternatively, if the user profile is not available from local DB 112, the admin server 105 is queried. Once the profile is returned to UI 111, the user can invoke any profile property displayed on profile 150. In box 162, the UI 111 dispatches any commands received from open profile 150.

Figure 8:
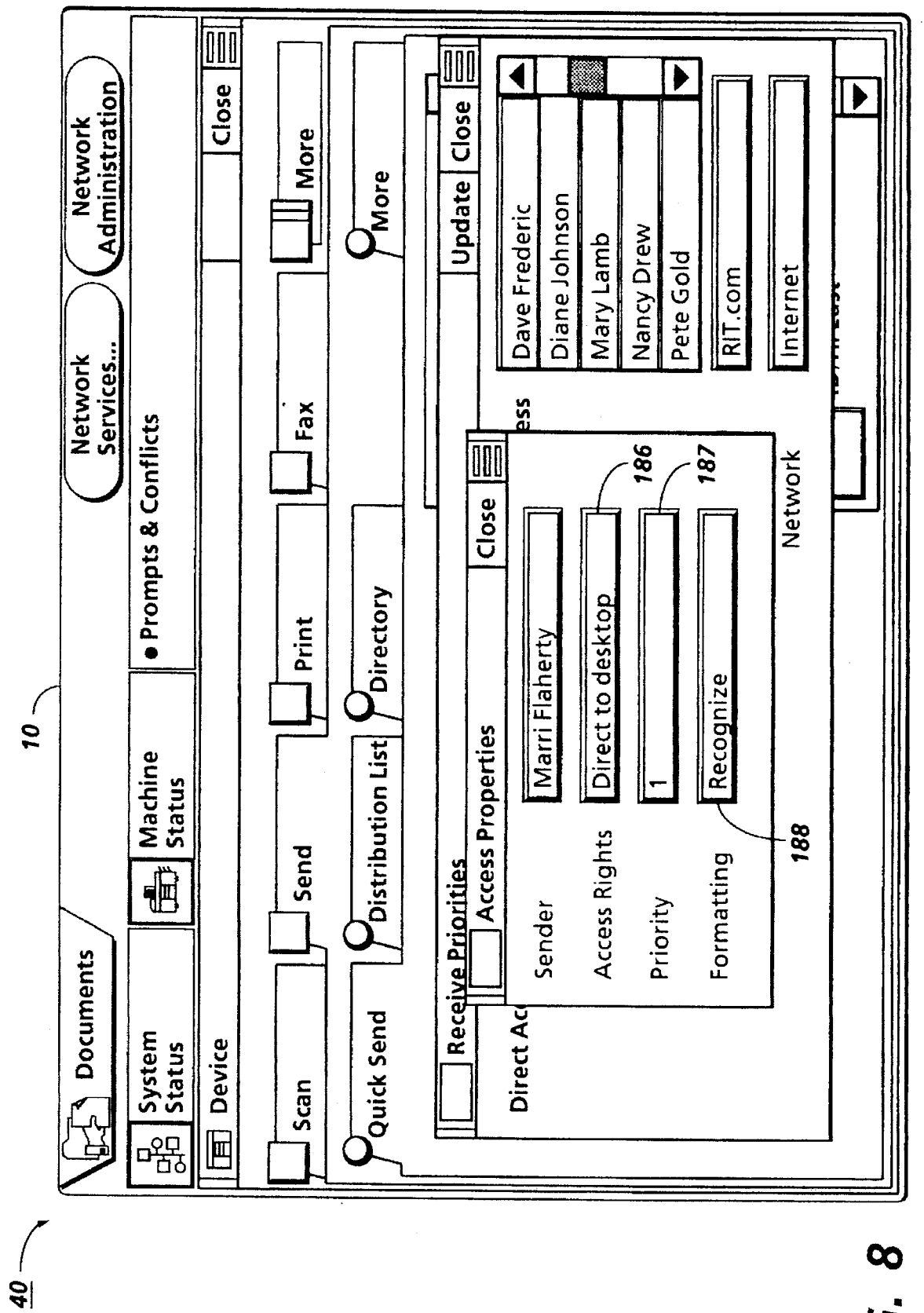
FIG. 8 shows a simulated screen image of the access properties of a communication channel.

At box 163, a profile property 153 has been selected. If the property is determined not to be complex at box 164, the property specifications are displayed, at box 165, as shown for example in FIG. 5 for the page printer selection window 159. If the property is complex, then as illustrated at box 178, additional lists or sub properties are accessed for display as further described below with respect to FIG. 8. At any time after changing or simply viewing a profile property, a determination is made at UI 111 if any changes required at box 166 should be recorded. At box 167, profile changes that have been enumerated are recorded by manager 110. In both cases, (whether or not the profile property specifications have been modified) the control returns to box 162 where subsequent commands from profile 150 can be dispatched.

After making profile changes or simply after opening profile 150, at box 168, the profile can be published, either to network admin server 105 at box 169 or to groups or individuals identifiable by network 24 at box 170. If groups or recipients have been identified, their identity is verified at box 171. Subsequently, at box 175, the user profile is published to the network or to an individual or groups of individual network users. However, before publication, elements in the profile 150 are updated in local database 112, if they have been modified, in order that local and published profiles remain consistent. This is shown at box 172 determining if there are modified profiles or properties and updating the modified profiles in local data base 112 as shown in box 174. After publication, profile 150 is closed as shown at box 176, followed by waiting for the next user command at box 177. (If no publication is required, the user can select the close command in the herald of profile 150.)

2. Channel Access Control

Figure 7:
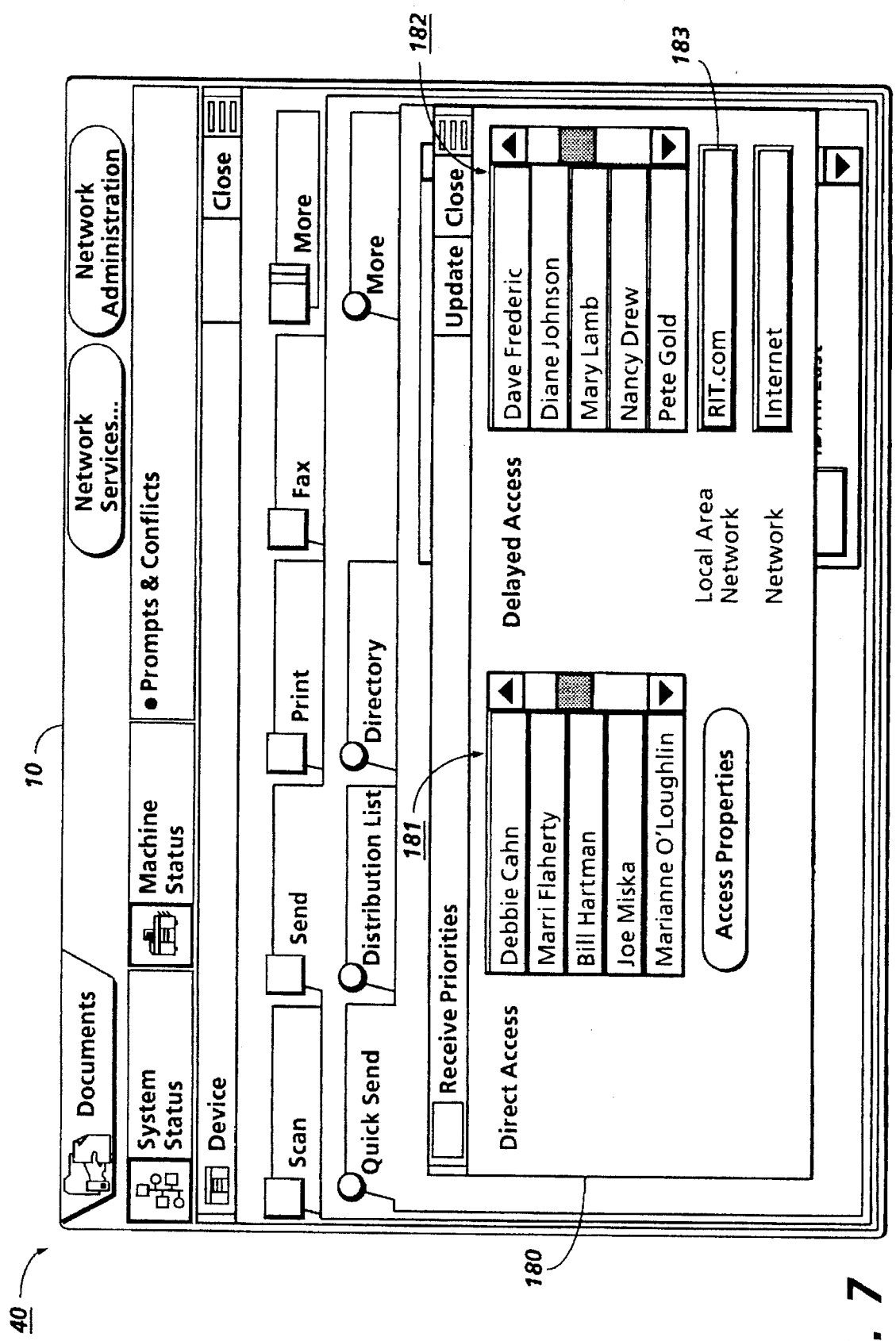
FIG. 7 shows a simulated screen image of receiver setable communication channel profiles.

From profile 150, receive priorities 154 can be selected to open receive priorities window shown in FIG. 7 to select additional priorities for receipt of information based upon factors such as the identity or status of the sender. Direct access priorities 181 and delayed access priorities 182 establish the access control of a user's communication channel 63. In this case, priorities established by a user determine where information is to be received and what level of priority should be given to that information. Priorities 154 sorts network users into multiple directories such as directories 181 and 182. Direct access places received information or data into a preferred location such as directly into the receiver's electronic mailbox whereas delayed access places received data in a remote or less accessible location. Delayed access group 182 is a directory of network users (e.g., a network directory). This directory is updated by manager 110 by querying admin server 105. The user can move individuals from one directory to another simply by selecting the individual and moving its iconic representation to an alternate directory.

Additionally, access properties can be retrieved from any network supporting an admin server 105 by identifying the path 183 of the network. Access properties can be modified individually for each user listed in directories 181 and 182, as shown, for example, for user Marri Flaherty in FIG. 8. The sequence of steps required to establish channel access for different users is shown in FIG. 6. At box 164, receive priorities 154 has been selected. Since only necessary information is maintained locally to system 102, remote admin server 105 is queried at box 178. Displayed access properties 182 can be altered to the preference of the user. For example, the access rights property 186 specifies whether a sender's information is sent to a printer, to a queue or to a desktop. For instance, a receiver may provide an individual with "interrupt at desktop" privileges and another with a "reject" or busy return message. Priority property 187 ranks users as to their interrupt priority. Formatting property 188 provides the receiver with the ability to keep the senders finishing options (e.g. job ticket information). For example, a document sent may specify staple or bind for output specifications. Using formatting property 188, a user can specify whether to ignore such document specifications.

To summarize, communication channel control includes channel profile publication, where a network user who is the receiver of a document has the capability to set forth either through publication to the network or in a more limited fashion to other network users (or groups of users through distribution lists) a profile describing the preferred form (facsimile, electronic mail, voice mail, hard copy, color or black, file server, etc.) and service (the specific printer, facsimile machine etc.) documents should take to be rendered. Thus, individuals always wanting their documents printed on a color printer can specify the printer and the appropriate format that document should take. As a result, users are provided with an ability to establish consistency in the form with which documents are to be received by each user on a network using a universal method (i.e. method which is easily accessible to everyone on the network).

D. Channel Operation

Figure 9:
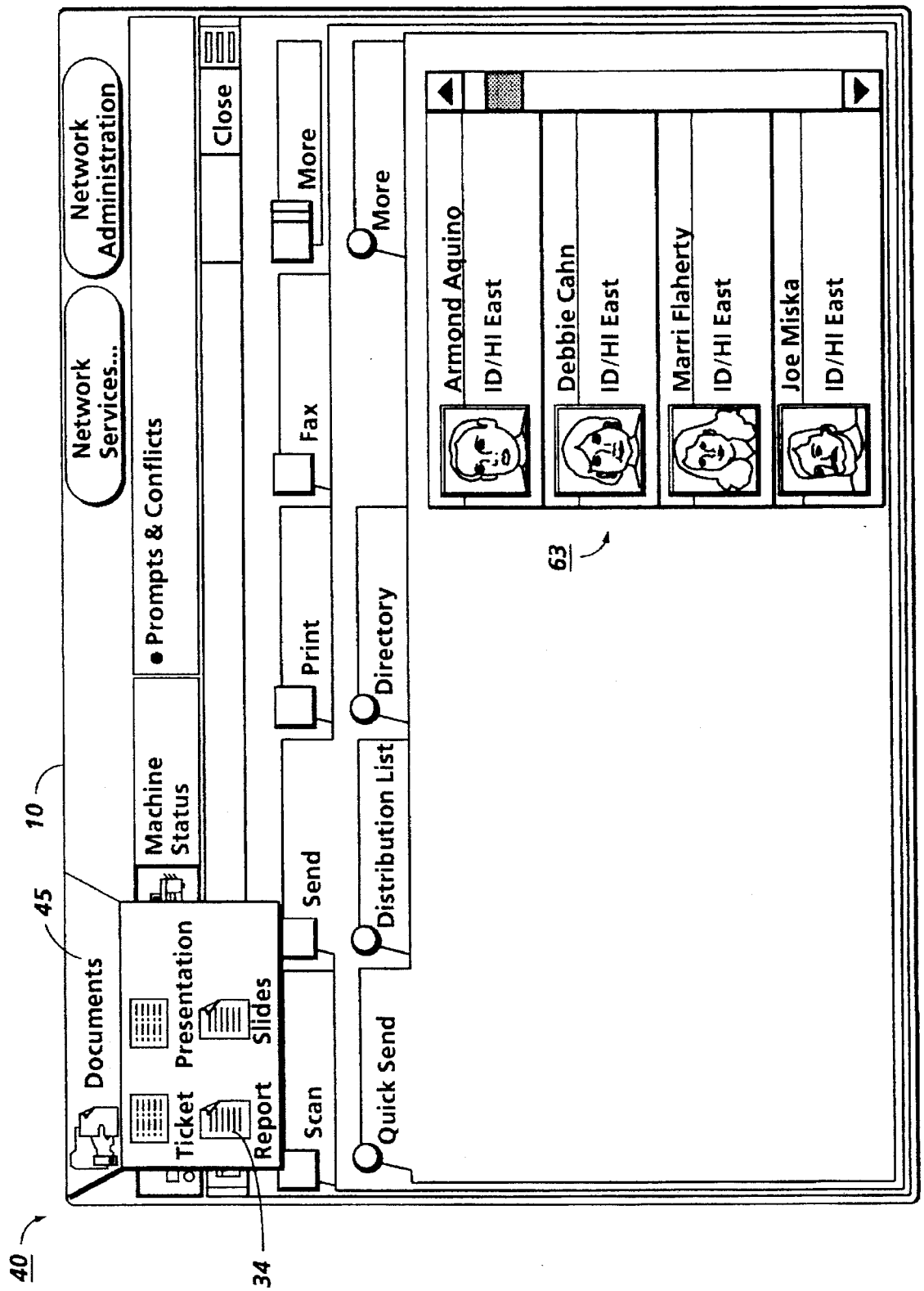
FIG. 9 shows a simulated screen image of information being sent using a communication channel.
Figure 10:
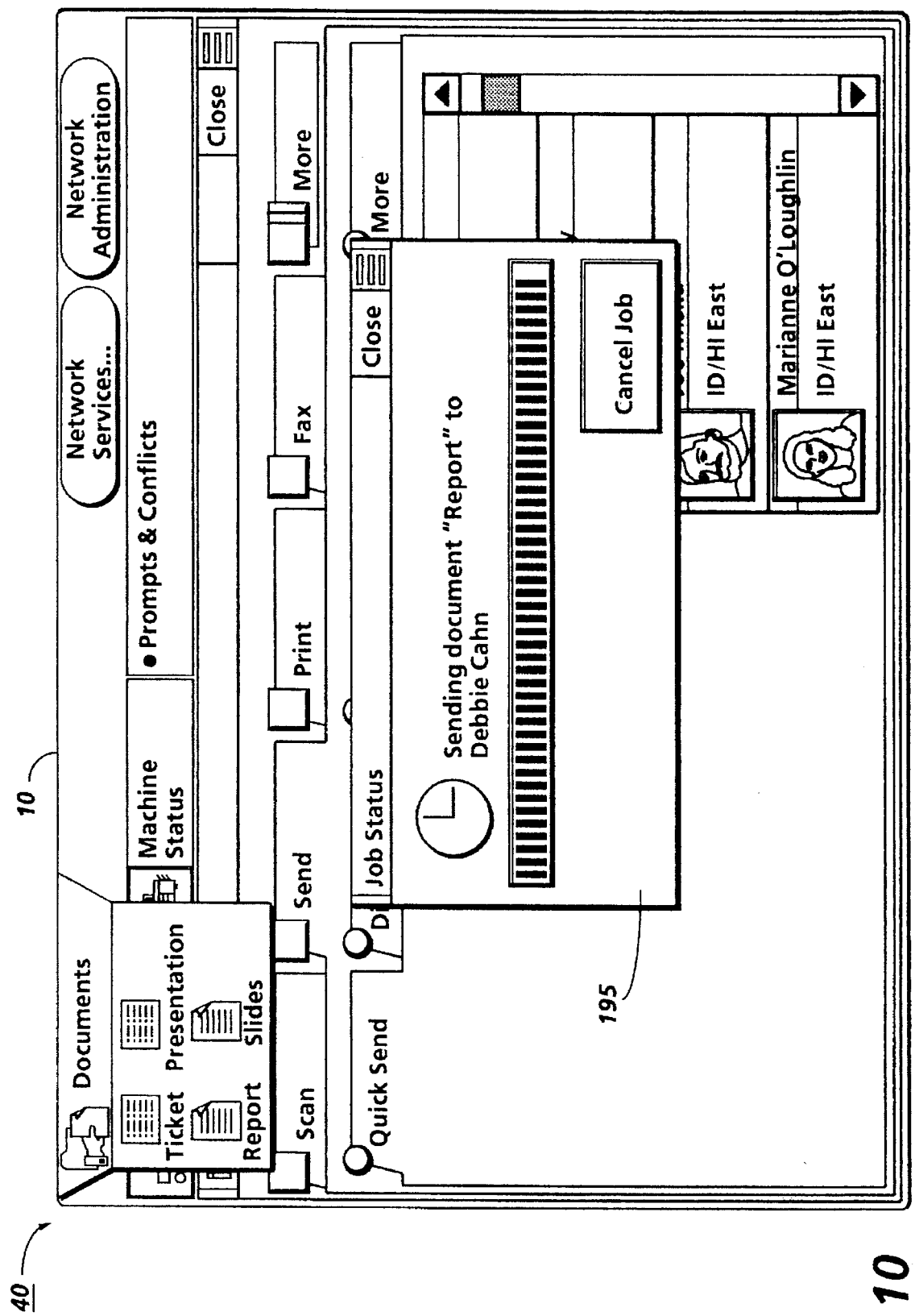
FIG. 10 shows a simulated screen image of the status of the information being sent in FIG. 9.
Figure 11:
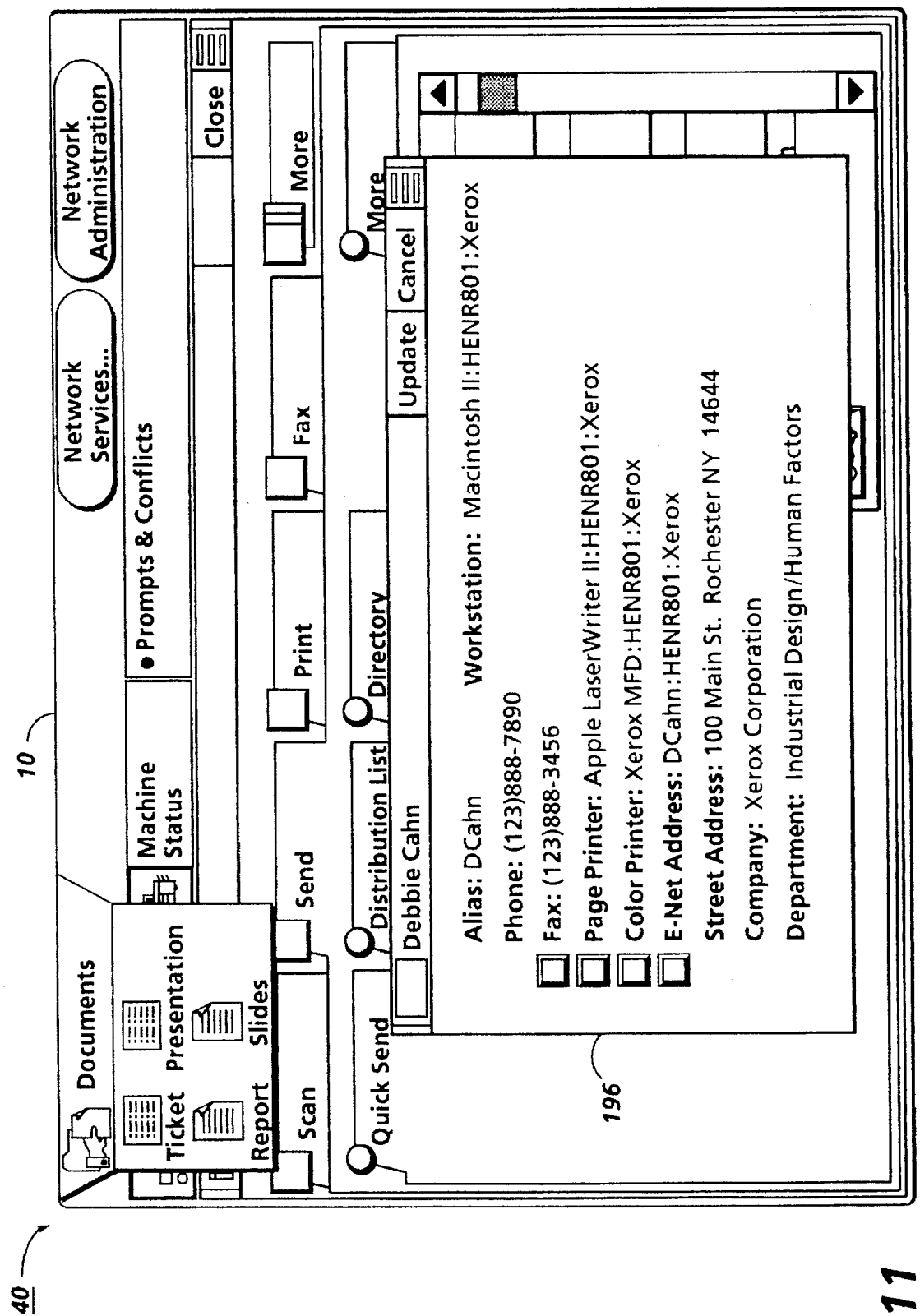
FIG. 11 shows a simulated screen image of a communication channel of a receiver being optimized by a sender.

To operate a communication channel such as channel 63, select a document from document source 45 (:e.g. report 34) and move it to communication channel 63 as shown in FIG. 9. Job status window 195 shown in FIG. 10 subsequently displays the document send progress. When sending a document through a communication channel without modifying its properties as shown in FIG. 11, the channel takes on properties published by the receiver. Profile properties window 196, open by a user sending information, displays properties of the channel device from the receiver's channel profile. In the example shown in FIG. 11, Debbie Cahn's communication channel allows the sender of information to select a document's disposition from either fax, page printer, color printer, or electronic mail. This option is enabled by the receiver at the time of channel publication. For example, this channel could have been forwarded to the current document sender by Debbie Cahn in order that this individual have adequate flexibility to send information. In this example, if the sender using system 4 had sent report 34 to Debbie Cahn without accessing Debbie's profile 196, Debbie would have received report 34 over her Fax line (123-888-3456) since her Fax line is prioritized highest of the selected (checked) profile properties. It should be noted that it is well within the scope of the present invention to provide many alternate modes of identifying, listing, and accessing options, priorities, and defaults with respect to a receiver profile and making such options and priorities selectively accessible to potential individual senders as well as groups and categories of senders.

E. Summary Overview

Communication channels enable the recipients of documents in a network multimedia environment to define the form with which the document should take upon receipt. Initially, channel profiles are published to a defined network audience to establish a communication channel defined by the published profile. This enables a sender to distribute documents with a prior knowledge of the preferred disposition a document should have. An advantage derived from a receiver driven document distribution system is that information takes the form most desired by the document recipient. Communication channels help make systems more productive by enabling information receivers to have information in their desired format so that it does not need to be converted from multiple sender formats.

APPENDIX A

```
CommunicationChannel: DEFINITIONS =
  BEGIN
  - TYPE DEFINITIONS
  StreetAddress: TYPE = RECORD [
      alias: AliasType,
      street: LONG STRING,
      town: LONG STRING,
      zipCode: LONG CARDINAL,
      company: LONG STRING,
      department: LONG STRING,
      mailStop: LONG STRING];
  AliasType: LONG POINTER TO ARRAY OF LONG STRING;
  ProfileOption: TYPE = RECORD [
      server: Address,
      preferredVersion: LONG CARDINAL,
      preferredFormat: LONG STRING,
      phoneNumber: LONG STRING,
      alternateProfile: ProfileOptionType]; -- e.g. fax goes direct to
          printer
  Command: TYPE = {update, ignore, publish, forward};
  Status: TYPE = {ok, errors};
  Address: TYPE = RECORD [address: LONG STRING, path: LONG
      STRING, alias: AliasType];
  SenderAccessRights: TYPE = {deskTop, secondaryStorage, queue,
      reject};
  PriorityType: TYPE = {interrupt(0), high(1), medium(2), low(3),
      background(4), ignore(5)};
  ReceivePriorityType: TYPE = {direct, delayed};
  AccessProperties: TYPE = RECORD [
      priority: PriorityType,
      accessRights: SenderAccessRights];
  ReceivePriorityRec: TYPE = RECORD [
      next: ReceivePriorities, -- link list of individual Receive-
```

APPENDIX A-continued

```
      Priorities
      type: ReceivePriorityType,
      modified: BOOLEAN,
      profileID: FileID,
      profile: ChannelProfile,
      accessProperties: AccessProperties];
  ReceivePriorities: TYPE = LONG POINTER TO ReceivePriority-
      Rec;
  SendProfilesRec: TYPE = RECORD [
      next: ReceivePriorities, -- link list of individual Receive-
          Priorities
      profile: ChannelProfile];
  SendProfiles: TYPE = LONG POINTER TO SendProfilesRec;
```

APPENDIX B

```
Profile: TYPE = RECORD [
    modified: BOOLEAN,
    enabled: BOOLEAN,
    cashed: BOOLEAN,
    locked: BOOLEAN, -- if locked by receiver then read only
    version: CARDINAL,
    priorityOfReciept: CARDINAL,
    profile: ProfileOption];
ProfileOptionType: TYPE = {workstation, phone, fax, pagePrinter,
    colorPrinter, secondaryPrinter, email, audio, video, secondaryStorage};
    -- fax → use alternateProfile to establish incomming profile option
    -- phone → server implies vmax server and path box
ChannelProfilePtr: TYPE = LONG POINTER TO Profile;
ChannelProfileRec: TYPE = RECORD [
    preferredOption: ProfileOptionType,
    secondaryOption: ProfileOptionType,
    teriaryOption: ProfileOptionType,
    streetAddress: StreetAddress,
    profileArray: ARRAY ProfileOptionType OF ChannelProfilePtr];
    -- nil indicates the value is not specified
ChannelProfile: TYPE = LONG POINTER TO ChannelProfileRec;
- PROCEDURE DEFINITIONS
OpenChannelProfile: PROCEDURE [ ]
    RETURNS[channelProfile: ChannelProfile];
CloseChannelProfile: PROCEDURE [command: Command, profile:
    ChannelProfile, address: Address]
    RETURNS[status: Status, msg: LONG STRING];
OpenReceivePriorities: PROCEDURE [ ]
    RETURNS[receivePriorities: ReceivePriorities];
CloseReceivePriorities: PROCEDURE [command: Command, receive-
    Priorities: ReceivePriorities]
    RETURNS[status: Status. msg: LONG STRING];
ForwardProfile: [channelProfile: ChannelProfile, address: Address];
PublishProfile: [channelProfile: ChannelProfile];
OpenQuickSend: PROCEDURE [ ]
    RETURNS[sendProfiles: SendProfiles];
Send: PROCEDURE [channelProfile: ChannelProfile, data: LONG
    POINTER TO STREAM]
    RETURNS[status: Status, msg: LONG STRING];
END.
```

While the invention has been described with reference to the structure disclosed, it is not confined to the details set forth, but it is intended to cover such modifications or changes as may come within the scope of the following claims.

We claim:

1. In an electronic workstation interconnected to predetermined devices over a network, the workstation having a graphical user interface for operating the workstation and providing access to a communication channel profile for each subscriber on the network, the communication channel profile defining a priority scheme for identifying a preferred mode in which to transmit data to said predetermined devices, the graphical user interface comprising:

a display adapted for displaying the graphical user interface which includes icons and menu options, predetermined icons identifying data files, means to select icons and menu options on the graphical user interface, means to identify a given data file on the display using the means to select icons, means to specify a destination for said given data file, means to access said communication channel profile for transmitting said given data file in a preferred mode, the means to access identifying a given device in response to the preferred mode set forth in said priority scheme and means for altering the priority scheme for identifying a preferred mode in which to transmit data to said predetermined devices.

2. The graphical user interface of claim 1 including means for preventing the altering of the priority scheme for identifying a preferred mode in which to transmit data to said predetermined devices.

3. In a graphical user interface for communicating information between senders and receivers over a network having a plurality of network subscribers, the network providing a repository for storing a communication channel profile for each network subscriber to define preferences of data receipt for a receiver of data over the network, a method of sending information from a sender operating the graphical user interface to a selected receiver comprising the steps of:

selecting information at the graphical user interface for sending to the selected receiver;

querying the network repository for the communication channel profile of the selected receiver; and sending said information to the selected receiver over a first communication channel in response to a first preference of data receipt specified in the communication channel profile of the selected receiver including the capability of altering the communication channel profile of said receiver at the graphical user interface.

4. The method of claim 3 wherein said communication channel profile defines a second preference of data receipt including the step of sending said information to the selected receiver over the second communication channel in response to the second preference of data receipt.

5. The method of claim 4 wherein said first communication channel is unavailable.

6. The method of claim 3 wherein said communication channel profile defines a second preference of data receipt including the step of automatically sending said information to the selected receiver over the second communication channel in response to the failure of said first communication channel.

7. The method of claim 3 including a plurality of sources of information and wherein said preferences of data receipt for receivers over the network is a function of the source of the information to be sent.

8. A graphical user interface interconnected to a network and communicating with a plurality of network users subscribed to the network, comprising:

a display adapted for displaying primitives of the graphical user interface which include windows, icons and menu options, predetermined icons identifying data files, means electrically connected to the display for selecting icons and menu options, means to specify a data file icon on the display, a quick send directory for quickly identifying a network user, the quick send directory including identifiers for identifying communication channel profiles of selected network users, and means to access the identifier for a selected network user, the means to access including a window specifying the preferred mode of receipt of a data file by said selected network user including means for a network user to allow alteration of the preferred mode of receipt of a data file, means for automatically transmitting a data file to one of the selected network users by engaging the data file icon with the identifier of one of the selected network users in the quick send directory, the automatic transmitting means transmitting the data file in accordance with the communication channel profile of the selected network user so that the data file is received in a mode of data transmission preferable to the selected network users.

9. The graphical user interface of claim 8 including a window for displaying the progress of the transmitting of the data file to said one of the selected network users.

10. The graphical user interface of claim 8 wherein the window specifies preferred devices for receipt of a data file.

11. The graphical user interface of claim 10 wherein the window specifies a priority of modes for receipt of a data file.

12. The graphical user interface of claim 11 wherein the preferred mode for receipt of a data file include at least one from a set of printer, facsimile, and electronic mail devices.

13. The graphical user interface of claim 12 including means for a network user to set a preferred mode of receipt of a data file.

14. The graphical user interface of claim 13 wherein the means for a network user to set a preferred mode of receipt of a data file includes a displayed window for selecting predetermined devices.

15. The graphical user interface of claim 13 including means for a network user to bar alteration of the preferred mode of receipt of a data file.

16. The graphical user interface of claim 13 wherein the priority scheme is responsive to a data file type.

17. The graphical user interface of claim 13 including means for altering the priority scheme of modes of data receipt for a plurality of remote address profiles.

18. The graphical user interface of claim 13 wherein the remote system element is a printing system.

* * * * *